Patented May 31, 1949

2,471,742

UNITED STATES PATENT OFFICE 2,471,742

POLYMERIZATION OF ACRYLONITRILE

Stuart A. Harrison, Stow, Ohio, assignor to The B. F. Goodrich Company, New York, N. Y., a corporation of New York No Drawing. Application July 13, 1946, Serial No. 683,423

2 Claims. (Cl. 260—88.7)

This invention relates to stable aqueous dispersions or latices containing dispersed finely-divided particles of hard synthetic resins such as polyacrylonitrile and to a method of preparing the same, and is particularly concerned with the preparation of such latices by the polymerization in aqueous emulsion of a monomeric material predominantly comprising acrylonitrile or other nitrile of an alpha-methylene aliphatic monocarboxylic acid.

Although the polymerization of acrylonitrile in aqueous emulsion in the presence of an emulsifying agent such as soap or the like has long been known to the art, it has not heretofore been possible in general to produce the polymeric product in the form of a stable aqueous dispersion or latex. Rather the polymeric product has tended to separate from the emulsion during the polymerization even when a relatively high proportion of emulsifying agent is used, and hence is secured in the form of a granular mass or powder. While such a granular polymer is useful for some purposes, such as for molding, its insolubility in most solvents and its hard resinous nature prevents its being used for many other purposes such as for forming films and coatings, and in other applications where it is necessary to apply the polymer in fluid form.

I have now discovered, however, a method whereby acrylonitrile and other nitriles of alpha-methylene aliphatic monocarboxylic acids such as methacrylonitrile, ethacrylonitrile, alpha-chloro acrylonitrile or the like, either alone or in admixture with each other or with lesser amounts of other polymerizable compounds, may be polymerized in aqueous emulsion to yield a stable latex containing dispersed, finely-divided particles of the hard resinous nitrile polymer. Since the particles in such a latex remain dispersed when the latex is allowed to stand or when subjected to handling and applying operations, it becomes possible to utilize the nitrile polymer in applications where resin in dispersed form is required. One application of particular importance consists in preparing polymeric materials comprising a major proportion of a synthetic rubber and a minor proportion of hard resinous nitrile polymer, as by mixing a synthetic rubber latex with the latex of nitrile polymer and then coagulating, in the manner more fully described in the copending application of Stuart A. Harrison and Walter E. Brown, Serial No. 671,898, filed May 23, 1946.

The method of this invention consists in polymerizing a monomeric material predominantly comprising a nitrile of an alpha-methylene aliphatic monocarboxylic acid, preferably acrylonitrile, in an aqueous emulsion comprising, in addition to the emulsified monomeric material, an emulsified liquid, chlorine-containing organic compound which is chemically unchanged under the conditions of the polymerization (that is, one which does not polymerize or otherwise react during the polymerization) in a concentration of about 10 to 100% by weight preferably 20 to 60% by weight, based on the weight of monomeric material.

A preferred chlorine-containing organic compound of the character described is ethylene dichloride (1,2-dichloroethane) since it has been found that nitrile resin latices of best properties are obtained when this compound is used. Other chlorine-containing organic liquids which are chemically unchanged during the polymerization and which also may be employed include other chlorine derivatives of paraffin hydrocarbons (i. e., compounds wherein one or more of the hydrogens of a paraffin hydrocarbon is replaced by chlorine) such as carbon tetrachloride, chloroform, trichloroethanes, tetrachloroethanes, butyl chlorides, hexyl chlorides and the like; chlorine derivatives of cyclic hydrocarbons (compounds wherein one or more of the hydrogens of a cyclic hydrocarbon are replaced by chlorine) such as chlorobenzenes, dichlorobenzenes, cyclohexyl chloride and the like; and chlorine derivatives of ethers (compounds wherein one or more of the hydrogens of an ether is replaced by chlorine) such as beta, beta'-dichloro-diethyl ether, alpha and beta chloroethyl ethers, dichloroether and the like. Organic chlorine-containing compounds which are polymerizable such as vinyl and vinylidene chloride and chlorine-containing compounds which are highly reactive such as acetyl chloride etc., however, are not operative in this invention since they are chemically changed under the conditions of the emulsion polymerization of the nitrile. The chlorine compounds employed, in general, are liquids (at ordinary temperatures) which contain a chlorine atom attached to a carbon atom and, in addition to atoms of carbon and chlorine, no atoms other than hydrogen and ether oxygen atoms, and which are free from olefinic and acetylenic double bonds.

In the practice of the invention the monomeric material to be polymerized, and the chlorine containing organic compound are first emulsified in an aqueous medium with the aid of an emulsifying agent, preferably a fatty acid soap such as ammonium oleate, sodium stearate, sodium laurate or the like. The amount of soap used may be varied from as little as required to effect emulsification to as much as desired, but is ordinarily within the range of about 5 to 80 parts, preferably 10 to 60 parts, for each 100 parts of the monomeric material. Similarly, the amount of water present may be varied from that required to form an aqueous emulsion (i. e., one in which water is the continuous phase) to as much as desired, but is preferably within the range of about 450 to 700 parts for each 100 parts of monomeric material.

Other materials necessary or desirable for the polymerization may also be added to the emulsion containing the monomeric material and the chlorine-containing compound. Thus, a small amount of a polymerization initiator or catalyst such as potassium persulfate, sodium perborate, hydrogen peroxide, benzoyl peroxide, potassium ferricyanide, or the like is preferably included in the emulsion, as is customary in the art of conducting emulsion polymerizations. Other materials to serve some special purpose during the polymerization may also be included in the emulsion. For example, it has been found that the size of the dispersed nitrile resin particles in the latex obtained is dependent to a considerable extent upon the particular recipe employed; accordingly, if it is desired to prepare a latex in which the size of the particles is unusually small the use of small amounts of p-methoxy phenyl-diazo-thio (2-naphthyl ether), or similar diazo thioether, and of triisobutyl mercaptan, or similar aliphatic mercaptan, will produce this result.

Polymerization of the emulsified monomeric material is effected in the usual manner, preferably by agitating the emulsion at a temperature of about 20 to 60° C. for a time sufficient for a predominant amount of the monomeric material to be converted into resinous polymer, this usually requiring about 20 to 50 hours.

As above mentioned, the polymerization products obtained when proceeding in the manner described, are fluid, non-viscous, latex-like dispersions generally exhibiting considerable translucence. They contain, in general, from about 5 to 25% by weight of resinous nitrile polymer dispersed in the aqueous phase in the form of small particles less than about 0.1 micron in average diameter. The latices are stable on standing and on mechanical agitation and may be used as such in numerous applications. For example, the latex may be used, after compounding with plasticizers etc. if desired, to deposit nitrile resin coatings on fabrics or paper or the like. Alternatively, it may be coagulated in the usual manner to produce the nitrile resin in solid form.

The practice of the invention may further be illustrated by the following examples in which all parts are by weight.

Example 1

100 parts of acrylonitrile and 50 parts of ethylene dichloride are emulsified in an aqueous soap solution containing 600 parts of water and 60 parts of fatty acid soap. After adding 0.6 part of potassium persulfate, the emulsion is agitated at 50° C. for about 48 hours whereupon about 92% of the acrylonitrile is polymerized to form hard resinous polyacrylonitrile. The product is a fluid translucent latex containing about 12.5% by weight of polyacrylonitrile in the form of small particles of about 0.08 micron in average diameter dispersed in the aqueous phase. When the procedure is repeated, however, in the absence of ethylene dichloride, a latex is not obtained, despite the high soap concentration, but rather the emulsion coagulates during the polymerization and the polyacrylonitrile is obtained in the form of granules which separate from the aqueous phase.

Example 2

Example 1 is repeated using only 10 parts of fatty acid soap in place of 60 parts. A latex similar to that of Example 1 is obtained.

Examples 3 to 9

In these examples 100 parts of acrylonitrile and various parts of various chlorine-containing organic compounds are emulsified with an aqueous solution containing 600 parts of water, 10 parts of fatty acid soap and 0.6 part of potassium persulfate, and are then agitated for about 3 days at 50° C. The chlorine-containing compounds utilized and their proportions are as follows:

| | Parts |
|---|---|
| Example 3—p-Chloro benzene | 50 |
| Example 4—p-Chloro benzene | 30 |
| Example 5—p-Chloro benzene | 10 |
| Example 6—Carbon tetrachloride | 50 |
| Example 7—Chloroform | 50 |
| Example 8—Beta-beta' dichloro diethyl ether | 50 |
| Example 9—n-Butyl chloride | 50 |

In each example a latex is obtained, there being only insignificant amounts, if any, of precoagulated polyacrylonitrile present. In the absence of the chlorine-containing compound, however, all of the polyacrylonitrile secured is precoagulated and no latex is obtained.

Example 10

An aqueous emulsion is prepared from 100 parts of methacrylonitrile, 50 parts of ethylene dichloride, 30 parts of fatty acid soap, 0.6 part of potassium persulfate and 490 parts of water, and the emulsion is agitated at 50° C. for about 44 hours. A non-viscous fluid latex of resinous polymethacrylonitrile is thus obtained. When the example is repeated using other nitriles of alpha-methylene aliphatic monocarboxylic acids such as alpha-chloro-acrylonitrile, alpha-methoxy-acrylonitrile, alpha-ethyl-acrylonitrile and the like, similar latices are secured.

Example 11

Example 10 is repeated using 50 parts of acrylonitrile and 50 parts of methacrylonitrile in place of 100 parts of methacrylonitrile. A latex of a resinous acrylonitrile methacrylonitrile copolymer is secured.

The above examples illustrate the preparation of latices from monomeric materials consisting exclusively of nitriles of alpha-methylene aliphatic monocarboxylic acids. The invention, however, is not limited to this type of monomeric material but also includes the preparation of resin latices from monomeric materials containing a predominant amount of the nitrile with a lesser amount of some other unsaturated compound copolymerizable with the nitrile. Examples of such copolymerizable compounds include styrene and its derivatives; alkyl esters of alpha-methylene monocarboxylic acids such as methyl acrylate and methyl methacrylate; vinyl chloride, vinylidene chloride; diethyl maleate and the like, all of which are unsaturated polymerizable compounds containing a single olefinic double bond.

Polymerizable compounds containing more than one olefinic double bond such as butadiene-1,3, chloroprene, etc. may also be present in minor proportions in admixture with the nitrile in the monomeric material to be polymerized, if desired.

The following Example 12 illustrates the practice of the invention utilizing, as the monomeric material, a mixture of a nitrile with a copolymerizable compound. This example also illustrates the preparation of latices of extremely small particle size by the use of special materials in the emulsion.

*Example 12*

An aqueous emulsion is prepared containing 50 parts of acrylonitrile and 5 parts of styrene as the monomeric polymerizable materials, 40 parts of ethylene dichloride, 300 parts of water, 15 parts of fatty acid soap, 0.3 part of potassium ferricyanide, 0.35 part of triisobutyl mercaptan and 0.2 part of p-methoxy-phenyl diazo thio(2-naphthyl) ether. The emulsion is then agitated at 30° C. for about 20 hours, whereupon the monomeric materials are polymerized and a clear, non-viscous latex containing dispersed acrylonitrile styrene copolymer in the form of exceedingly small particles (about 0.03 micron in average diameter) is obtained.

Numerous variations and modifications in the invention as illustrated in the specific examples will be apparent to those skilled in the art, and hence it is not intended that the invention be limited to the examples but only as required by the spirit and scope of the appended claims.

I claim:
1. The method of preparing a latex containing dispersed, finely-divided particles of polyacrylonitrile which comprises polymerizing acrylonitrile in an aqueous emulsion containing from 10 to 100% by weight based on the acrylonitrile, of ethylene dichloride.
2. The method of preparing a latex containing dispersed, finely-divided particles of polyacrylonitrile which comprises polymerizing acrylonitrile in an aqueous emulsion containing, for each 100 parts of acrylonitrile, from 20 to 50 parts of ethylene dichloride, from 10 to 60 parts of fatty acid soap, as the emulsifying agent, and from 450 to 700 parts of water.

STUART A. HARRISON.

REFERENCES CITED

The following references are of record in the file of this patent:

UNITED STATES PATENTS

| Number | Name | Date |
|---|---|---|
| 2,256,148 | Lichty | Sept. 16, 1941 |
| 2,343,095 | Smith | Feb. 29, 1944 |

FOREIGN PATENTS

| Number | Country | Date |
|---|---|---|
| 422,697 | Great Britain | Jan. 14, 1935 |
| 573,270 | Great Britain | Nov. 14, 1945 |